Feb. 10. 1925.

E. J. BAIRD

POULTRY FEEDER

Filed Nov. 29, 1919

Witness
W. A. Blanchard

Inventor:
Everett J. Baird
By
Attorney

Patented Feb. 10, 1925.

1,525,561

UNITED STATES PATENT OFFICE.

EVERETT J. BAIRD, OF WORCESTER, MASSACHUSETTS.

POULTRY FEEDER.

Application filed November 29, 1919. Serial No. 341,536.

*To all whom it may concern:*

Be it known that I, EVERETT J. BAIRD, a citizen of the United States, residing at the city of Worcester, in the county of Worcester and State of Massachusetts, have invented new and useful Improvements in Poultry Feeders, of which the following is a specification.

This invention relates to improvements in poultry feeders and especially relates to a type wherein a feed pan is adapted to slidably fit a horizontal cross section of a protecting cage into which it slides through a lateral opening.

One object of my invention is to provide a form of feeder in connection with which a feed pan can be readily inserted or quickly withdrawn from a protecting cage forming a part of this invention.

Another object of my invention is to provide a type of feeder which is not only adapted to handle successfully all liquid or solid foods but is also adapted to be easily cleaned and disinfected the same as any ordinary pan.

With the above and other objects in view my invention consists in the combination, arrangement and details of construction, disclosed in the drawings and specifications and then more clearly pointed out in the appended claims.

In the drawings, which are merely illustrative of my invention, a type of cage is illustrated that is adapted to support a conical hood. However, this construction as well as the arrangement of bars and general shape may be varied without departing from the real principles involved as brought out in the drawings and appended claims.

In the drawings wherein similar reference characters designate similar parts throughout the respective views:—

Figures 1, 2:
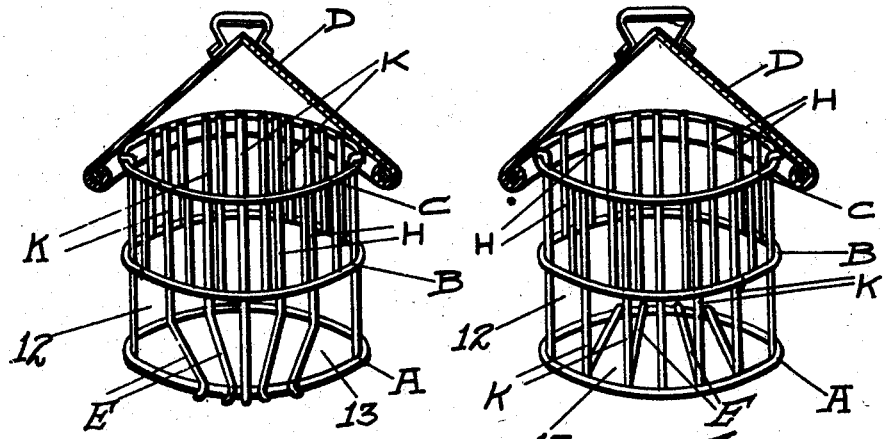
Fig. 1 is a front view of the cage portion without the feed pan especially illustrating the lateral opening through which the feed pan slides.
Fig. 2 is a rear view of the cage portion without the feed pan especially illustrating the retaining wall for the feed pan.
Figure 3:
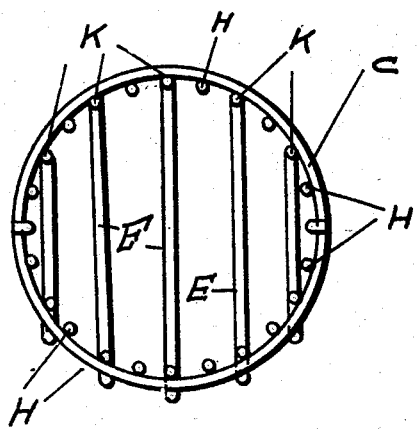
Fig. 3 is a view looking down into the cage with the conical hood removed and illustrates the construction of the base or pan supporting portion.
Figure 4:
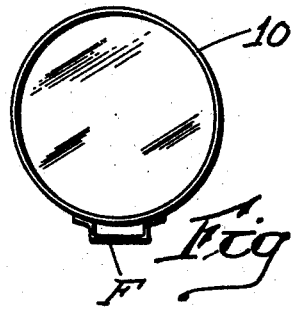
Fig. 4 is a top view of a feed pan withdrawn from the cage.
Figure 5:
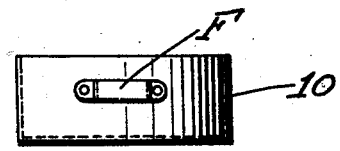
Fig. 5 is a view of the side elevation of the feed pan.

In the drawings are disclosed the following details of my invention:—10 is a drink or feed pan and F the handle thereof; A, B, and C, are three vertically spaced apart horizontal rings made of any suitable material such as metal bands or wire similar in shape and size, A is the lower and C is the upper band and B is a ring placed midway between A and C; K and H are a series of vertical bars made of the same material as A, B, and C, secured around the perimeters of A, B, and C, the bars H are cut off at the middle ring B and are secured only to the rings C and B, however the bars K continue below the ring B to the ring C and are secured to all of the rings A, B, and C; some of the bars K are terminated horizontally in the bands E across the ring A forming an under support upon which the pan 10 may slide; the conical hood D is secured to the ring C so as to close the upper portion of the cage. It will easily be seen that the cage portion now has a lateral opening 12 formed by cutting off the bars H at the ring B and also has a pocket 13 limited by the rings A and B and the lower portion of the bars K and by the bands E. It is to be noted that the pan 10 is of a width and height sufficient to slide or pass through the lateral opening 12 into and out of the pocket 13 and is of a diameter sufficient to slidably fit the pocket 13. When the pan 10 is pushed into the pocket 13 through the opening 12 the lower portion of the bars K form a retaining wall for the pan 10 and a side of the pan 10 fills in the lateral opening through which it enters the cage and thus completes the cage.

My invention permits any suitable pan to be slipped into and out of a protecting cage. It is therefore very easy to clean and refill. It is a well-known fact that success in obtaining winter eggs depends largely in keeping the birds free from disease, and their food and drink in a clean and sanitary condition. In this feeder the pan can be cleaned and scoured like any plain ordinary pan, and when refilled it can be simply slid into a protecting cage where it is absolutely protected, yet at all times can be reached by the birds as easily as an ordinary pan.

What I claim is:—

1. In combination, a cage consisting of a circumferentially extending series of rungs, a ring to which all of said rungs are attached, some of said rungs projecting below said ring and extending around a distance less than half the circumference of the cage, another ring spaced below the first ring and being parallel thereto, and means formed integrally upon the portions of said rungs below the first-named ring and being connected to the last-named ring and adapted to support a pan.

2. In a device as described in combination, a cage consisting of a circumferentially extending series of vertical rungs certain of which are made longer than the others to provide prolongations extending around an arc of the cage to provide a wire side frame against which may contact a cylindrical pan the prolongations of said rungs being shaped to provide an under support for said pan, and a pan on said support cooperating with said under support to make the lower portion of the cage truly circular.

3. A cage including vertically spaced apart rungs, some of said rungs being cut away to provide a lateral pan receiving opening, while the other rungs are arranged to form a depending arcuate side wall limiting the movement of the pan in one direction, the lowermost portions of the last-named rungs being formed rightangularly with a spaced apart series of rungs thereby forming a wire bottom rest for the pan.

4. In a device as described in combination, a cylindrical series of vertically arranged rungs forming a wire cage, some of said rungs being shorter than the others and terminating midway the length of the other rungs, and a pan operatively supported by the lower portions of said longer rungs, within said cage, and rendering the portions of said cage subtended by said pan imperforate.

5. A device as described consisting of a cylindrical cage composed of vertical rungs formed with a disk-like base portion and a cylindrical pan, said vertical rungs immediately above said base portion being formed with a slot, said pan being insertable thru said slot and resting on said base portion in a manner to be supported in the same horizontal plane with the said slot so that the side wall of said pan completely closes the slot.

6. A poultry feeder consisting of a circular series of vertical rungs, a ring connecting said rungs, certain of said rungs being arranged in an arc below said ring and shaped to provide a horizontal flat surface for a pan, a cylindrical pan engaging said flat surface and the sides of the adjacent arc-arranged rungs and closing the arcuate gap formed by the latter.

7. In combination a cage frame composed of a circular series of vertical rungs and a pair of horizontally disposed rings secured to all of said rungs at their upper ends and at another point therebelow, a conical hood secured to the upper ring so as to close the upper portion of the cage, a lower cage annex provided with an opening and constructed by the extension of some of said vertical rungs below the second named ring and by horizontal terminals formed on said extended rungs of said annex so as to provide a pan supporting base, and a pan adapted to slidably fit said annex and close said opening.

8. A device as described consisting of a cylindrical series of vertical rungs, a ring secured to the upper portion of all of said rungs, certain of said rungs projecting below the remaining rungs around an arc of a circle, the projecting portions of said last-named rungs being bent rightangularly, another ring secured to the terminal of said short rungs and also to the other rungs, and a ring engaging the bights of said longer rungs and having the terminals of said rightangular portions secured thereto.

9. A device as described composed of a hollow frame having a series of slots therein, and also having an integral portion below said slots formed with a flat bottom and with a pan receiving opening, and a pan slidably mounted on said flat bottom within the plane of said opening so as to be introduced thru the latter into said frame, said pan being of a height and diameter to engage the entire inner surface of said lower frame portion so as to close said opening completely.

10. In combination a cage having a lower horizontal cross section limited by a pair of vertically disposed horizontal rings and partly surrounded by an arcuate series of vertical rungs some of which terminate horizontally across said lower ring to form a base support for a pan, and a pan adapted to enter said section through a lateral opening and slidably fit said section and close said opening.

In testimony whereof, I have affixed my signature in presence of two witnesses.

EVERETT J. BAIRD.

Witnesses:
　WILLIAM E. BAFF,
　R. E. DONAHUE.